United States Patent [19]

Nelson et al.

[11] 3,972,475

[45] Aug. 3, 1976

[54] NOZZLE CONSTRUCTION PROVIDING FOR THERMAL GROWTH

[75] Inventors: Roy G. Nelson, Lake Park; Louis H. Wolfson, Juno Isles, both of Fla.

[73] Assignee: United Technologies Corporation, Hartford, Conn.

[22] Filed: July 31, 1975

[21] Appl. No.: 600,545

[52] U.S. Cl. .......................... 239/127.3; 239/265.41; 239/397.5
[51] Int. Cl.² ...................... B64C 15/06; F02K 1/24
[58] Field of Search ............. 60/228, 230, 232, 242, 60/266, 269, DIG. 5; 239/127.3, 265.39, 265.41, 397.5

[56] References Cited
UNITED STATES PATENTS

| | | | |
|---|---|---|---|
| 2,801,516 | 8/1957 | Battle et al. | 239/265.39 |
| 2,815,643 | 12/1957 | Geary et al. | 239/265.39 |
| 2,989,845 | 6/1961 | Howald | 239/265.41 |
| 3,046,730 | 7/1962 | Petren | 239/265.39 |
| 3,730,436 | 5/1973 | Madden et al. | 235/265.39 |
| 3,767,120 | 10/1973 | Harmon | 239/265.39 |
| 3,794,244 | 2/1974 | McMath | 239/265.41 |

*Primary Examiner*—Evon C. Blunk
*Assistant Examiner*—Andres Kashnikow
*Attorney, Agent, or Firm*—Jack N. McCarthy

[57] ABSTRACT

An exhaust nozzle has main flaps with seals therebetween. Each flap and seal is constructed having inner and outer members which cooperate to form a liner for passing cooling air therethrough which extends substantially around the entire circumference of the liner. The inner member of each of the seals is riveted at its forward end to a guide and support member which is in turn fixed to its outer member while the remainder of the inner member is permitted thermal growth by sliding on said guide and support member. The outer member is bolted to the guide and support means. Said guide and support means being corrugated to permit cooling flow therethrough with the heighth of the corrugations providing the proper contour for the inner member.

6 Claims, 5 Drawing Figures

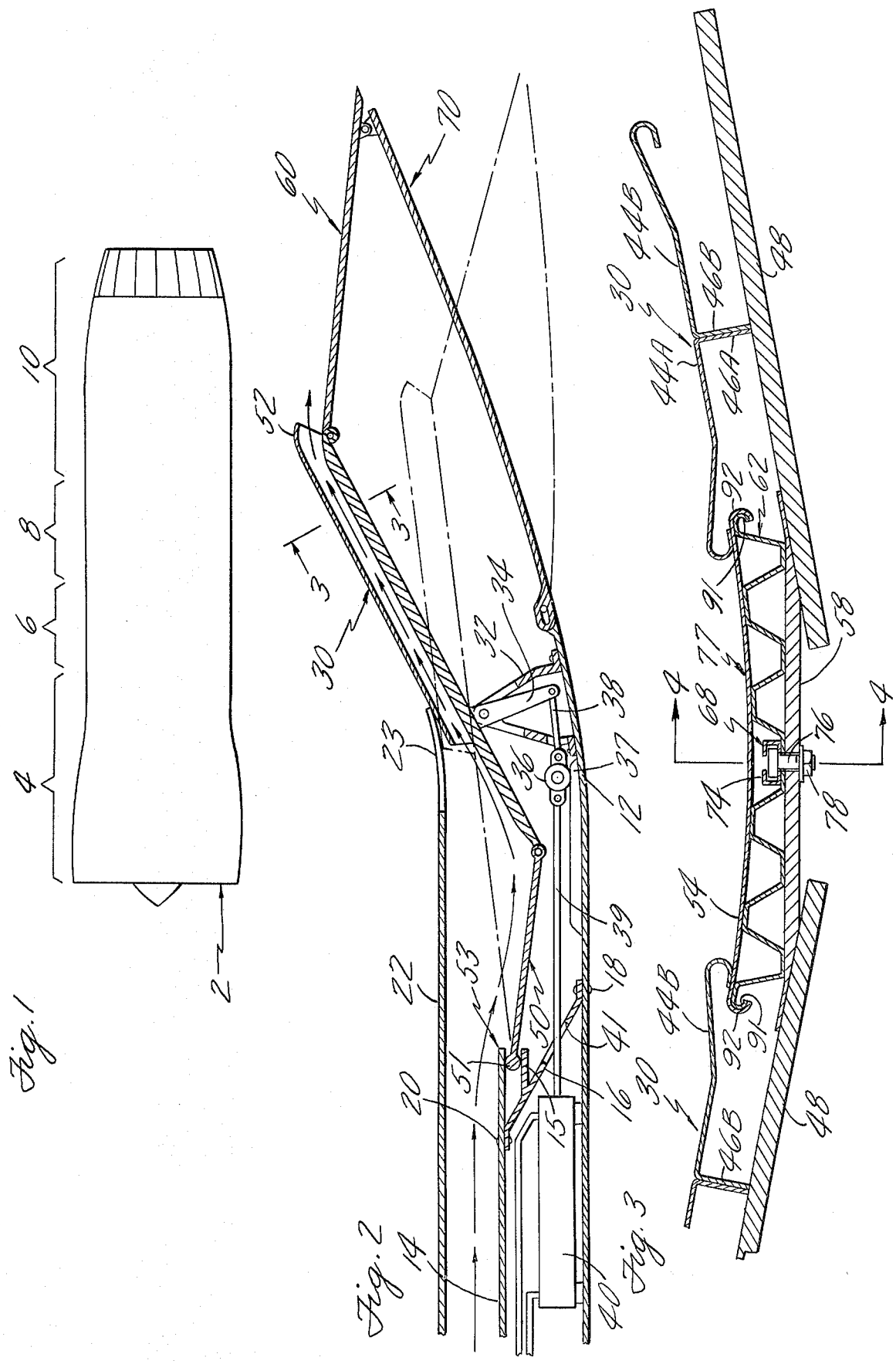

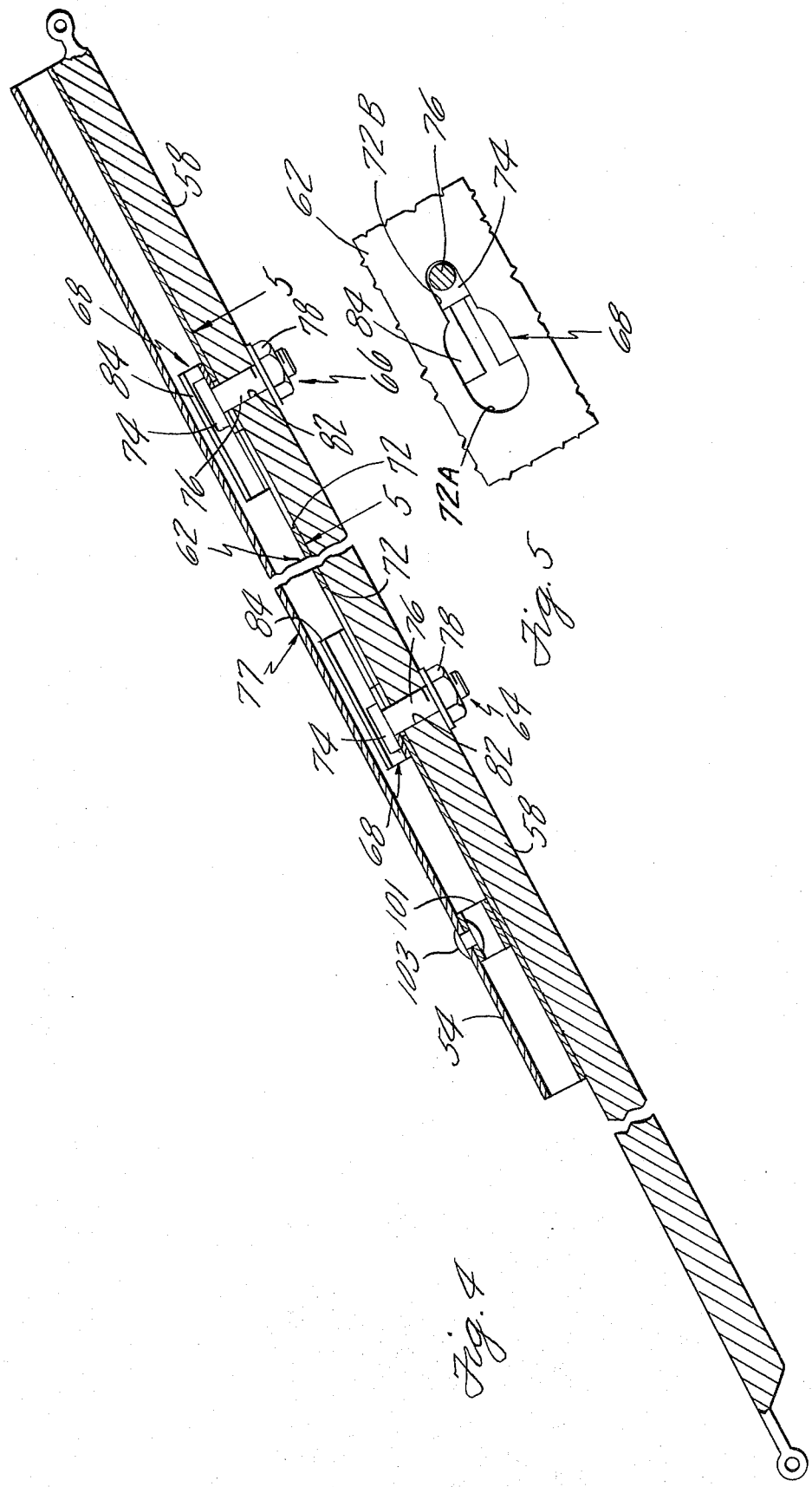

NOZZLE CONSTRUCTION PROVIDING FOR THERMAL GROWTH

The invention herein described was made in the course of or under a contract or subcontract with the Department of the Air Force.

BACKGROUND OF THE INVENTION

This invention relates to a variable geometry nozzle to be used on a turbojet engine and particularly to means for providing a cooling fluid directly to said nozzle with a cooling liner being capable of accepting a large thermal gradient between the inner hot surface and the cooled support member.

While many cooled nozzles are in the prior art, none appear to provide the cooperating movement between the flaps and seals to provide a cooling liner which functions while the nozzle changes its position between a small and large area. Three patents showing variable area nozzles with coolant flow are U.S. Pat. Nos. 2,801,516; 2,989,845 and 3,046,730. Application Ser. No. 519,739, which is assigned to the assignee of the present invention, also shows a variable area nozzle of this type.

SUMMARY OF THE INVENTION

It is an object of this invention to provide a basic construction for a nozzle cooling liner wherein cooling air flows through the nozzle and seal means while the nozzle is permitted to move between a position of small area and a position of large area.

It is an object of this invention to provide a cooling liner capable of accepting a large thermal gradient between the hot inner surface and the cooled support member.

An object of this invention is to provide a construction wherein a hot inner member is fixedly mounted at one end and permitted to have thermal growth changes with respect to a cooler outer support member. The support member also provides for supporting the hot inner member at a predetermined contour.

A further object of this invention provides curved guides and cooperating curved guiding members along the sides of the hot inner member and support member.

BRIEF DESCRIPTION OF THE DRAWING

FIG. 1 is a view illustrating the location of a nozzle on a turbojet engine.

FIG. 2 is an enlarged sectional schematic view taken through the nozzle and the rear portion of the engine shows the cooling liner on a nozzle flap.

FIG. 3 is an enlarged view taken along the line 3—3 of FIG. 2 showing the flaps and seals.

FIG. 4 is a view taken along the line 4—4 of FIG. 3.

FIG. 5 is a view taken along the line 5—5 of FIG. 4.

DESCRIPTION OF THE PREFERRED EMBODIMENT

Referring to FIG. 1, the engine 2 shown includes the conventional compressor section 4, the burner section 6, turbine section 8, and exhaust duct and nozzle section 10. In FIG. 2, the inner case 14 is shown fixed to the outer housing structure 12 by a conical shaped connecting member 16. This member is attached to the outer housing by bolts 18 and extends forwardly to a point where it is connected to the inner casing by bolts 20, forming the section of a cone. An inner liner 22 is positioned around and fixedly spaced from the inner side of inner case 14. Spaced fingers 23 extend rearwardly from the end of the inner liner 22 and are formed to be resilient for a purpose to be hereinafter described.

A plurality of main flaps 30 are mounted for pivotal movement at the rear end of the outer housing structure 12. These flaps are each pivotally mounted on a bracket member 32 which extends inwardly from the end of the structure 12. An actuating arm 34 extends outwardly from each flap and movement of the arm actuates the attached main flap 30 about its pivotal mounting. Each flap 30 is pivotally mounted at a desired balance point. In one nozzle design, this location was made approximately one-third of the distance from its forward edge.

So that all the main flaps 30 are moved in unison, the free end of each of the arms 34 is connected to a unison ring 36 by a connecting link 38. A plurality of actuators 40 are mounted in the space between the housing structure 12 and the inner case 14 in front of the connecting member 16. An actuating rod 39 extends from each of the actuators 40 and is attached to the unison ring 36. The unison ring 36 is centered within and slides on track members 37 spaced around the outer housing structure 12. Each actuating rod 39 extends through an opening 41 in the connecting member 16. A nozzle control connects one side of the actuator to an actuating pressure while opening the opposite side to drain thereby movably positioning the main flaps 30. An arrangement of this type is shown in U.S. Pat. No. 2,815,643.

A plurality of balance flaps 50 extend forwardly of the main flaps 30. Each flap 50 has its rearward end pivotally connected to the forward end of a main flap 30 while its forward end has cylindrical means 51 thereon which is mounted for axial movement in a track means 53. Each track means 53 is formed between a rearward extension of the inner case 14 and a rearward extending flange 15 on the connecting member 16. While a simple cylindrical means and track means has been shown, any type of device permitting axial movement along with a change in angular position of the balance flap 50 can be used.

A plurality of divergent flaps 60 extend rearwardly of the main flaps 30. Each flap 60 has its forward end pivotally connected to the rearward end of a main flap 30 while its rearward end is pivotally connected to the rear end of an external flap 70. Each external flap 70 has its forward end pivotally mounted at the rear end of the housing structure 12, just rearwardly of the bracket members 32. Each of these pivotal connections can include a lost-motion movement (see U.S. Pat. No. 3,767,120).

Each of the annular set of flaps, the balance flaps 50, the main flaps 30, the divergent flaps 60, and the external flaps 70, have seal means positioned along adjacent side edges of cooperating flaps to prevent an excessive amount of leakage therebetween. Seal means for this type of nozzle are shown in U.S. Pat. Nos. 3,730,436 and 3,794,244.

The balance flaps 50, the diverging flaps 60 and the external flaps 70 can have simple seal flaps located therebetween for sealing, however, the main flaps 30 have a seal means 77 which cooperates with the main flaps 30 to provide a cooling liner around the flaps which can vary to provide liner circumferential continuity while the nozzle changes position.

As seen in FIG. 3, each main flap 30 includes two inner flap members 44A and 44B which are connected by rib members 46A and 46B, respectively, along their length at adjacent ends thereof to the center of an outer flap member 48. While the rib members 46A and 46B can be continuous, it can also be made of a plurality of smaller members, in line, providing for flow therearound, or have holes therethrough. Further, members 44A and 44B and rib members 46A and 46B could be made as one piece. Said inner flap members 44A and 44B extends for a short distance further than the length of the outer flap member 48 to the fingers 23. The rear end of each inner flap member 44A and 44B is curved outwardly at 52 to direct a coolant flow from between the inner flap members 44A and 44B and outer flap member 48 along the inner surface of divergent flaps 60. The forward end of the flap 30 receives a cooling fluid between the inner flap members 44A and 44B and outer flap member 48 from between the inner liner 22 and inner case 14 and balance flaps 50 (note airflow arrows). This flow can be directed from any source desired. The spaced fingers 23 contact the inner surface of the inner flap members 44A and 44B at a point inwardly from the connection of actuating arms 34.

To provide for sealing between the flaps 30 and maintain a cooling liner at this point, each seal means 77 includes an inner seal member 54 which is mounted by guide and support means 62 to an outer seal member 58. Said inner seal member 54 and guide and support means 62 extends from the rear end of the outer seal member 58 to a position forwardly of the rear end of the fingers 23. The width of the inner seal member 54 is such that in the open position of the nozzle, it will remain in contact with its cooperating inner flap members 44A and 44B. The open position of the nozzle is shown in FIG. 3. As the nozzle closes, the sides of the seal means 77 move inwardly toward the rib members 46A and 46B. This movement is similar to the actuation of the seal and flap members set forth in application Ser. No. 519,739, which is assigned to the assignee of the present invention, for a Cooling Liner for an Exhaust Nozzle. A seal centering means can be used such as shown in U.S. Pat. No. 3,794,244.

Each guide and support means 62 is formed in a corrugated fashion to permit the flow of a coolant through the seal means and provide support for the inner seal member 54 as gas forces act against it. The height of the corrugation decreases from the side edges towards the center so as to permit the inner seal member 54 to be supported in a predetermined curved manner (see FIG. 3). The guide and support means 62 is fastened to its cooperating outer seal member 58 by two bolt means 64 and 66. Each bolt means 64 and 66 comprise a bolt head 74, stem 76 and nut 78. The center corrugation, along with the other corrugations, is bent so that it engages the outer seal member 58 along its length. Two openings 72 are located in the center corrugation, one adjacent each end, of the guide and support means 62 where it engages the outer seal member. Each opening 72 is formed having a large elongated section 72A which will receive a bolt head 74 and a narrower section 72B which will receive a stem 76.

In attaching an outer seal member 58 to a guide and support means 62, a bolt means is placed in each of the openings 72 with the bolt head 74 located behind the narrower section 72B with the stem 76 extending through section 72B. The projecting stems are then placed through openings 82 in an outer seal member 58, nuts 78 then placed on the free end of the stems 76 and tightened to maintain the guide and support means 62 and outer seal member 58 together. For ease in assembly, a bolt head guide means 84 is fixed to each guide and support means 62 between the guide and support means 62 and the inner seal member 54. In placing a bolt head in position, it is placed through the enlarged opening 72A where it engages the guide means 68 and can be moved into a position with the stem in the opening 76. This guide means then maintains the bolt head 74 and stem 76 in position until the guide and support means 22 is positioned against the outer seal member 58.

Each guide and support means 62 is connected to its cooperating inner seal member 54 by mating curved edges 91 and 92, respectively, along each side. These curved edges have a cross section which is substantially semicircular. In assembly, the guide and support means 62 is placed with its curved edges 91 within the curved edges 92 of the inner seal member 54 and the two members are moved to their operative position which is with the rear edges of the members substantially in alignment. The front end of the inner seal member 54 is then riveted to a bracket 101 which is fixed to the bottom of the center corrugation of the guide and support means 62. This holding is performed by a single rivet 103. During engine operation, it can be seen that the inner seal member 54 is permitted thermal growth with respect to said guide and support means 62 from the rivet 103 rearwardly, with the two members being relatively slidable with each other on the curved edge 91 and 92. The inner seal member 54 is supported on the corrugation of the guide and support means 62 when gas loads are placed thereon. It can be seen that the seal means 77 can be easily disassembled and assembled for inspection and replacement of parts if necessary.

Further, this construction will permit greater use of materials having large variances in their coefficient of expansion and will permit the use of materials which are not compatible for welding.

We claim:

1. In combination with jet engine fixed structure including an exhaust duct; an exhaust nozzle mounted on said fixed structure; said nozzle comprising a circumferential row of flaps; means pivotally mounting said flaps on said fixed structure for controlling the flow of said exhaust duct; seal means being positioned between each pair of flaps to prevent leakage therebetween; said flaps comprising an inner flap member having an outer flap member spaced therefrom; said seal means comprising an inner seal member, a guide and support means, and an outer seal member; said inner seal member being spaced from said outer seal member by said guide and support means; said guide and support means being fixedly mounted to said outer seal member; said inner seal member being fixedly connected to said guide and support means at one point with the remainder of the inner seal member and guide and support means being permitted relative axial movement; said flaps and said seal means cooperating to provide a passageway for coolant flow through said flaps and seal means.

2. A combination as set forth in claim 1 wherein said guide and support means is constructed having longitudinal corrugations to provide the proper support for the inner seal member and provide a plurality of passageways for the coolant flow through said seal means.

3. A combination as set forth in claim 1 wherein said inner seal member is also connected to said guide and support means by interconnecting curved edges along the longitudinal sides thereof to permit axial movement therebetween.

4. A combination as set forth in claim 1 wherein said outer seal member is fixedly mounted to said guide and support means by a plurality of bolts.

5. A combination as set forth in claim 2 wherein said corrugations are formed of predetermined heights to provide a predetermined contour to the inner flap member during engine operation.

6. A combination as set forth in claim 1 wherein said inner seal member is fixed to said guide and support means by a rivet.

* * * * *